United States Patent
Kurata et al.

(10) Patent No.: US 12,344,309 B2
(45) Date of Patent: Jul. 1, 2025

(54) VEHICLE-BODY LOWER STRUCTURE

(71) Applicant: TOYOTA JIDOSHA KABUSHIKI KAISHA, Toyota (JP)

(72) Inventors: Hiroyuki Kurata, Toyota (JP); Ryuma Osaka, Toyota (JP); Kenji Igashira, Amagasaki (JP); Shinnosuke Okuda, Mishima (JP); Masanori Kodera, Hamamatsu (JP); Hideyuki Tamaki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/760,306

(22) Filed: Jul. 1, 2024

(65) Prior Publication Data

US 2025/0010917 A1    Jan. 9, 2025

(30) Foreign Application Priority Data

Jul. 5, 2023 (JP) .................................. 2023-110931

(51) Int. Cl.
*B62D 21/11* (2006.01)
*B60K 1/04* (2019.01)

(52) U.S. Cl.
CPC ................ *B62D 21/11* (2013.01); *B60K 1/04* (2013.01); *B60K 2001/0411* (2013.01)

(58) Field of Classification Search
CPC .... B62D 21/11; B60K 1/04; B60K 2001/0411
See application file for complete search history.

(56) References Cited

U.S. PATENT DOCUMENTS

| | | | | |
|---|---|---|---|---|
| 5,392,873 A * | 2/1995 | Masuyama | ............. | B60L 50/64 180/68.5 |
| 5,992,926 A * | 11/1999 | Christofaro | ........ | B62D 25/2072 296/205 |
| 6,431,300 B1 * | 8/2002 | Iwase | ...................... | B60K 1/04 180/68.5 |
| 7,614,469 B2 * | 11/2009 | Kumar | ................ | H01M 50/204 180/68.5 |
| 8,511,412 B2 * | 8/2013 | Kawaguchi | .............. | B60K 1/04 180/68.5 |
| 9,139,074 B2 * | 9/2015 | Jarocki | .................... | B60L 50/64 |
| 9,937,781 B1 * | 4/2018 | Bryer | ..................... | B62D 35/02 |
| 11,214,137 B2 * | 1/2022 | Stephens | ................. | B60L 50/66 |
| 11,351,850 B1 * | 6/2022 | Calandruccio | ........... | B60K 1/00 |
| 11,444,352 B2 * | 9/2022 | Iacovoni | .................. | B60K 1/04 |
| 2004/0094340 A1 * | 5/2004 | Kawasaki | .............. | B60K 15/01 180/65.1 |

(Continued)

FOREIGN PATENT DOCUMENTS

JP    2018-158688 A    10/2018

*Primary Examiner* — Paul N Dickson
*Assistant Examiner* — Shams Dhanani
(74) *Attorney, Agent, or Firm* — Oliff PLC

(57) ABSTRACT

A vehicle-body lower structure includes: a front suspension member, a lower arm supported by the front suspension member; and a battery case that is disposed on the rear side of the front suspension member and houses a battery. The battery case includes: a front plate; and a frame extending in the left-right direction on a lower portion of the front plate. A block is attached to a front portion of the frame so as to be positioned on the rear side of the lower arm.

15 Claims, 3 Drawing Sheets

(56) References Cited

U.S. PATENT DOCUMENTS

| | | | |
|---|---|---|---|
| 2008/0160396 A1* | 7/2008 | Nishino | B60L 50/64 429/100 |
| 2013/0026786 A1* | 1/2013 | Saeki | B60K 1/04 296/187.08 |
| 2013/0248267 A1* | 9/2013 | Nitawaki | B60K 1/04 180/68.5 |
| 2018/0272852 A1* | 9/2018 | Ajisaka | B62D 21/152 |
| 2020/0161616 A1* | 5/2020 | Wang | H01M 50/271 |
| 2020/0361536 A1* | 11/2020 | Swain | B60G 11/02 |
| 2020/0373531 A1* | 11/2020 | Dupper | B60L 50/64 |
| 2020/0376947 A1* | 12/2020 | Yamada | B60K 1/04 |
| 2020/0376948 A1* | 12/2020 | Yamada | B60L 50/66 |
| 2020/0381686 A1* | 12/2020 | Yamada | B60L 50/66 |
| 2020/0384842 A1* | 12/2020 | Qin | B62D 25/20 |
| 2020/0406734 A1* | 12/2020 | Choi | B60N 2/015 |
| 2020/0406735 A1* | 12/2020 | Nagaya | B62D 21/09 |
| 2020/0406973 A1* | 12/2020 | Nagaya | B62D 21/03 |
| 2021/0001701 A1* | 1/2021 | Hoshinoya | B60L 50/60 |
| 2021/0107571 A1* | 4/2021 | Fujisawa | B62D 25/2036 |
| 2021/0245595 A1* | 8/2021 | Grace | H01M 50/249 |
| 2022/0006151 A1* | 1/2022 | Foran | B60L 58/26 |
| 2022/0080857 A1* | 3/2022 | Kim | H01M 10/486 |
| 2022/0097767 A1* | 3/2022 | Jeong | B62D 25/082 |
| 2022/0194198 A1* | 6/2022 | Blomstrand | B60K 1/04 |
| 2022/0209357 A1* | 6/2022 | Murai | H01M 50/249 |
| 2022/0320666 A1* | 10/2022 | Hashida | H01M 10/613 |
| 2022/0371421 A1* | 11/2022 | Tanizawa | H02J 7/0068 |
| 2023/0101105 A1* | 3/2023 | Hayakawa | B60L 50/66 180/68.5 |
| 2024/0243404 A1* | 7/2024 | Lee | H01M 50/249 |
| 2024/0405337 A1* | 12/2024 | Tatsuwaki | H01M 50/209 |

\* cited by examiner

VEHICLE-BODY LOWER STRUCTURE

CROSS-REFERENCE TO RELATED APPLICATION

This application claims priority to Japanese Patent Application No. 2023-110931 filed on Jul. 5, 2023, incorporated herein by reference in its entirety.

BACKGROUND

1. Technical Field

A technology disclosed in the present specification relates to a vehicle-body lower structure.

2. Description of Related Art

In Japanese Unexamined Patent Application Publication No. 2018-158688, a vehicle-body lower structure in which a battery is disposed on the rear side of a front suspension member is disclosed. The battery is housed in a case.

SUMMARY

When an impact at the time of a collision is great, there is a risk that a suspension member retreats, comes into contact with a battery, and causes damage to the battery. In particular, the possibility of lower arms supported by the suspension member coming into contact with the battery is high. The present specification provides a technology of protecting the battery at the time of a collision.

A vehicle-body lower structure disclosed in the present specification includes: a front suspension member; a lower arm supported by the front suspension member; and a battery case that is disposed on the rear side of the front suspension member and houses a battery. The battery case includes: a front plate; and a frame extending in the left-right direction on a lower portion of the front plate. A block is attached to a front portion of the frame so as to be positioned on the rear side of the lower arm.

When the suspension member retreats and the lower arm comes into contact with the front plate of the battery case at the time of a collision, there is a risk that the lower arm breaks through the front plate and comes into contact with the battery in the case. The block is disposed on the front portion of the frame having a high strength. The block is positioned on the rear side of the lower arm. When the lower arm retreats with the suspension member, the lower arm does not come into contact with the front plate of the case and comes into contact with the block. The block is supported by the frame extending in the left-right direction. The lower arm comes into contact with the block and the retreat stops. Therefore, the lower arm does not come into contact with the front plate, and the battery housed in the battery case is protected. The frame may be fixed to one of a rocker and a side frame of a vehicle body. The frame can reliably receive the impact of the collision.

The front suspension member includes: a pair of suspension side beams each having a front end and a rear end fixed to a vehicle body; and a suspension crossmember that joins the pair of suspension side beams to each other. At this time, the distance between the block and the lower arm may be shorter than the distance between the front plate and the suspension crossmember. A case in which the suspension crossmember comes into contact with the battery case at the time of a collision can also be avoided.

A refrigerant pipe that sends a refrigerant to a cooler that cools the battery may protrude from the front plate of the battery case to the front side. In this case, the distance between the block and the lower arm may be shorter than the distance between the refrigerant pipe and the suspension crossmember. The refrigerant pipe is also protected at the time of a collision.

A reinforcement plate that joins the front suspension member and the block to each other may be further included. The reinforcement plate receives a part of the impact of the collision. As a result, a force that causes the lower arm to retreat weakens. The reinforcement plate may extend to a place below the battery case. When the reinforcement plate retreats with the front suspension member, the reinforcement plate slips beneath the battery case, and cases in which the reinforcement plate causes damage to the battery case can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
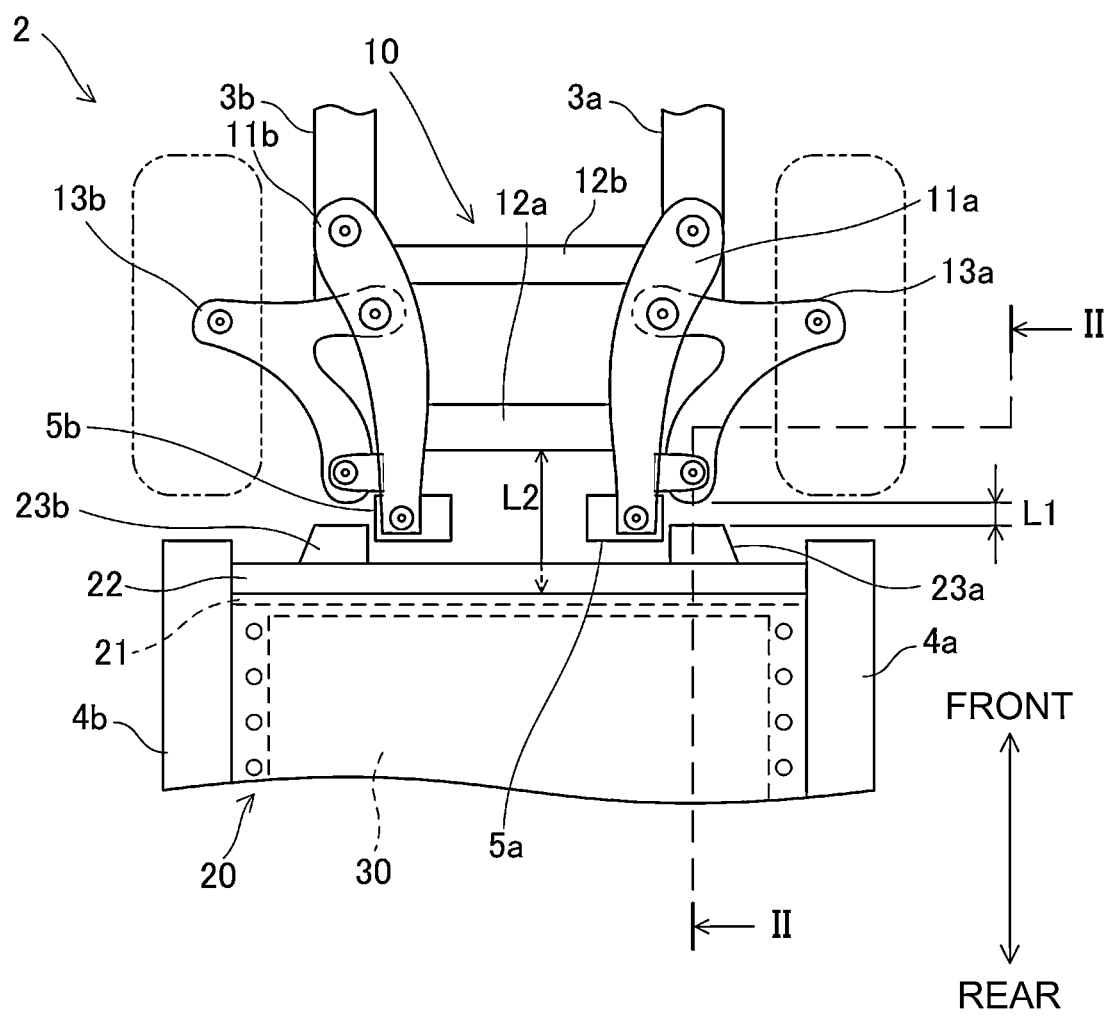
FIG. 1 is a bottom view of a vehicle body employing a vehicle-body lower structure of a first embodiment.
Figure 2:
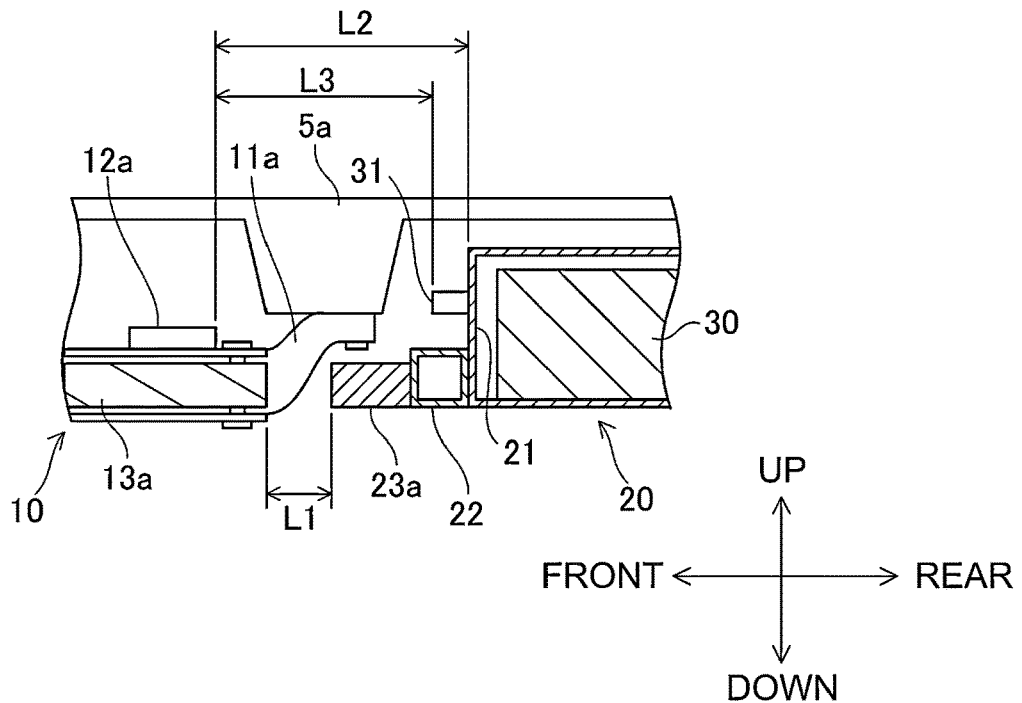
FIG. 2 is a sectional view taken along line II-II in FIG. 1.

A vehicle-body lower structure of a first embodiment is described with reference to the drawings. A bottom view of a vehicle body 2 employing the vehicle-body lower structure of the first embodiment is shown in FIG. 1. A sectional view taken along line II-II in FIG. 1 is shown in FIG. 2. FIG. 1 is a bottom view of a vehicle-body front portion. The vehicle body 2 is a vehicle body of a battery electric vehicle. In the vehicle-body front portion, a front suspension member 10 that supports front wheels is disposed. The front suspension member 10 includes a pair of suspension side beams 11a, 11b and a pair of suspension crossmembers 12a, 12b. The suspension side beam 11a (11b) extends in the vehicle-body front-rear direction and has a front end joined to a side member 3a (3b) and a rear end joined to a torque box 5a (5b) of the vehicle body 2. The torque boxes 5a, 5b are box-like members provided in a lower portion of a dash panel and enhance the rigidity of the vehicle body 2 about a roll axis. The side members 3a, 3b and the torque boxes 5a, 5b are a part of the vehicle body 2. The front suspension member 10 may be simply described as the suspension member 10 below in order to simplify the description.

The suspension crossmembers 12a, 12b are beams extending in the lateral direction of the vehicle body 2. The suspension crossmembers 12a, 12b each join the pair of suspension side beams 11a, 11b to each other. The suspension member 10 supports lower arms 13a, 13b. The lower arms 13a, 13b are members that support hubs (not shown) that rotatably support an axis of the front wheels.

A battery case 20 is disposed on the rear side of the suspension member 10. The battery case 20 houses a battery 30 that supplies electricity to a traveling motor (not shown). The battery case 20 is fixed to a pair of rockers 4a, 4b. The battery case 20 includes a front plate 21 and a frame 22. The frame 22 is a beam extending in the lateral direction of the vehicle body 2 and has ends that are joined to the rockers 4a, 4b, respectively. The frame 22 ensures the strength of the battery case 20.

A front portion of the frame 22 is fixed to blocks 23a, 23b. The block 23a (23b) is positioned on the rear side of the lower arm 13a (13b). A distance L1 between the block 23a (23b) and the lower arm 13a (13b) is extremely short. In other words, the block 23a (23b) is positioned immediately behind the lower arm 13a (13b). The distance L1 is shorter than a distance L2 between the front plate 21 of the battery case 20 and the suspension crossmember 12a (the suspension crossmember 12a on the rear side).

Figure 3:
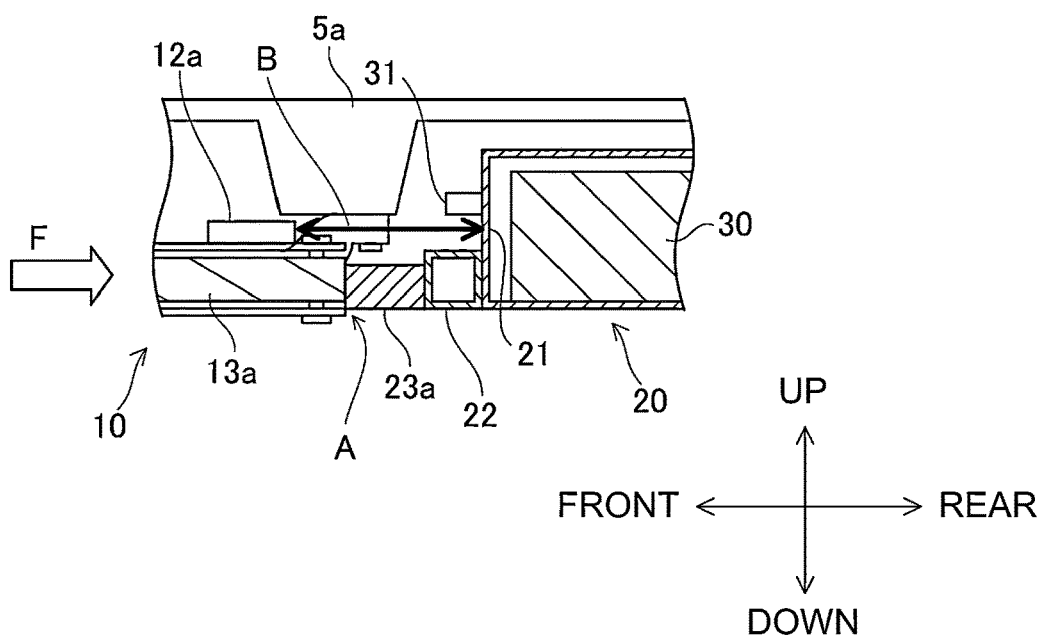
FIG. 3 is a sectional view showing a position of a suspension member at the time of a front collision.

The state in which a front collision of the vehicle body 2 occurs and a collision load F is applied to the suspension member 10 is shown in FIG. 3. The expression of a "front collision" means an aspect in which an automobile that is traveling collides with an obstacle ahead. When the collision load F is applied to the suspension member 10 from the front side, the suspension side beam 11a is deformed and the suspension crossmember 12a (12b) retreats. The lower arm 13a (13b) also retreats with the suspension crossmember 12a (12b). However, as shown by arrow A in FIG. 3, the lower arm 13a (13b) comes into contact with the block 23a (23b) positioned immediately behind the lower arm 13a (13b). The block 23a (23b) is fixed to the frame 22 having a high strength, and hence the collision load F is transmitted to the rockers 4a, 4b from the frame 22. The rockers 4a, 4b also have a high strength. Therefore, the retreat of the suspension member 10 stops after the lower arm 13a (13b) comes into contact with the block 23a (23b). A gap is secured between the suspension member 10 (suspension crossmember 12a) and the battery case 20 (see bold arrow B in FIG. 3). Therefore, the battery 30 housed in the battery case 20 is protected.

When the blocks 23a, 23b are not included, the lower arms 13a, 13b further retreat and move in the up-down direction at the time of a collision. When the lower arms 13a, 13b move to the upper rear side, there is a possibility that the lower arms 13a, 13b come into contact with the front plate 21 of the battery case 20. The front plate 21 is a thin plate, and hence the lower arms 13a, 13b may break through the front plate 21, come into contact with the battery 30, and cause damage to the battery 30. By disposing the blocks 23a, 23b, great retreat of the lower arms 13a, 13b is prevented. As a result, the contact between the lower arms 13a, 13b and the battery 30 is avoided.

A refrigerant pipe 31 extends from the front plate 21 of the battery case 20 to the front side. The distance L1 between the block 23a (23b) and the lower arm 13a (13b) is shorter than a distance L3 between the refrigerant pipe 31 and the suspension crossmember 12a (the suspension crossmember 12a on the rear side). At the time of a front collision, the lower arm 13a (13b) comes into contact with the block 23a (23b) and the retreat of the suspension member 10 is stopped. As a result, a gap is also secured on the front side of the refrigerant pipe 31. At the time of a front collision, the refrigerant pipe 31 is also protected.

Second Embodiment

Figure 4:
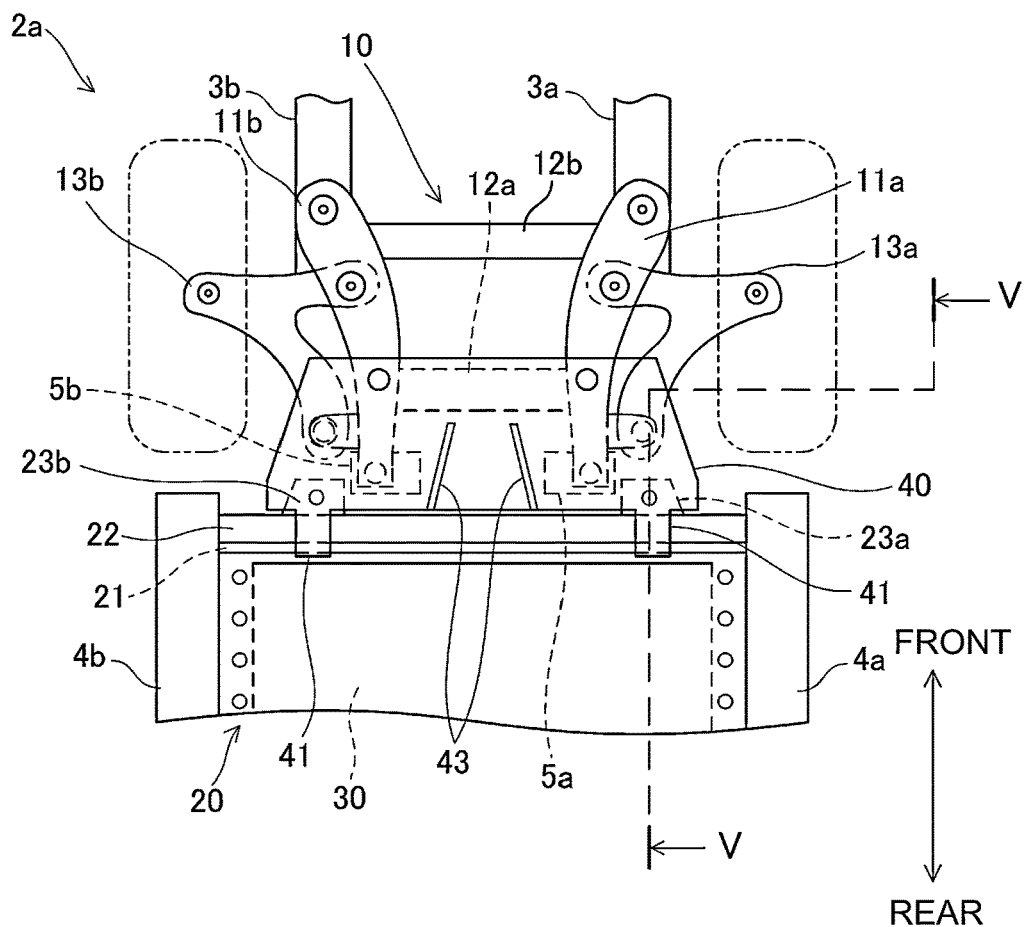
FIG. 4 is a bottom view showing a vehicle-body lower structure of a second embodiment.
Figure 5:
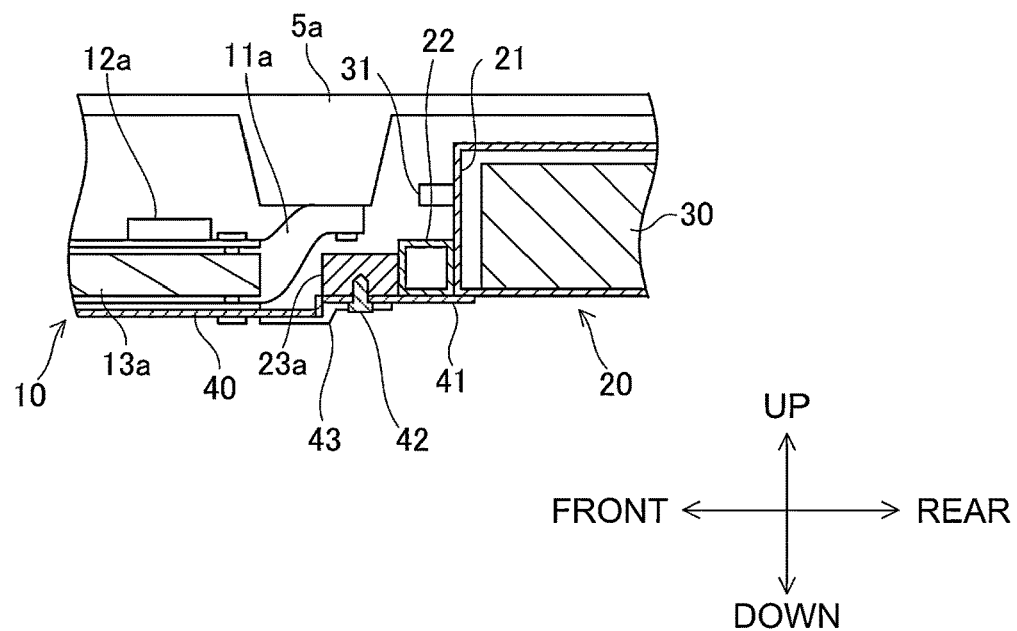
FIG. 5 is a sectional view taken along line V-V in FIG. 4.

A vehicle-body lower structure of a second embodiment is described with reference to FIG. 4 and FIG. 5. FIG. 4 is a bottom view of the vehicle body 2a in which the vehicle-body lower structure of the second embodiment is employed. FIG. 5 is a sectional view taken along line V-V in FIG. 4.

In the vehicle-body lower structure of the second embodiment, a reinforcement plate 40 is added to the vehicle-body lower structure of the first embodiment. The reinforcement plate 40 is joined to the suspension member 10 and the blocks 23a, 23b. The reinforcement plate 40 and the blocks 23a, 23b are joined to each other by bolts 42. Two tabs 41 extend from a rear edge of the reinforcement plate 40 to the rear side. The tabs 41 extend to a place below the battery case 20. Several beads 43 are provided on a lower 20 surface of the reinforcement plate 40.

At the time of a front collision, the reinforcement plate 40 supports the suspension member 10 from the rear side. In other words, the reinforcement plate 40 reduces the retreat amount of the suspension member 10 at the time of a front collision. By adding the reinforcement plate 40, the ability of protecting the battery 30 at the time of a collision is enhanced.

The plurality of beads 43 extending in the vehicle-body front-rear direction are provided on the reinforcement plate 40. The plurality of beads 43 contribute to the enhancement of the strength of the reinforcement plate 40.

The tabs 41 on the rear edge of the reinforcement plate 40 extend along the lower surface of the battery case 20. At the time of a front collision, the reinforcement plate 40 also retreats with the suspension member 10. The reinforcement plate 40 that retreats is guided by the tabs 41 and slips beneath the battery case 20. A case in which the reinforcement plate 40 that retreats abuts against the front plate 21 of the battery case 20 is avoided. A case in which the reinforcement plate 40 that retreats causes damage to the battery case 20 does not occur.

As described above, the vehicle-body lower structure of the embodiment protects the battery 30 at the time of a front collision. In particular, in the vehicle-body lower structure of the embodiment, the blocks 23a, 23b disposed immediately behind the lower arms 13a, 13b greatly contribute to the protection of the battery 30.

Points to note relating to the technology described in the embodiment are described. The blocks 23a, 23b are desired to be masses of metal. In the case of the vehicle-body lower structure of the second embodiment, the blocks 23a, 23b also function as brackets that fix the reinforcement plate 40 to the battery case 20.

In the vehicle-body lower structure of the embodiment, the frame 22 of the battery case 20 is fixed to the pair of rockers 4a, 4b. In the case of a vehicle body in which long side members 3a, 3b are employed, the frame 22 may be fixed to the side members 3a, 3b. In other words, the frame 22 of the battery case 20 only needs to be fixed to any of the rockers 4a, 4b and the side members 3a, 3b.

Although specific examples of the present disclosure have been described above in detail, these are merely exemplifications and do not limit the scope of claims. The technology described in the scope of claims includes those obtained by variously modifying and changing the specific examples exemplified above. The technical elements described in the present specification or the drawings exhibit a technical utility by itself or various combinations, and are not limited to the combinations described in the claims as originally filed. The technology exemplified in the present specification or the drawings may achieve a plurality of objects at the same time, and has a technical utility by achievement of one of those objects itself.

What is claimed is:

1. A vehicle-body lower structure of a vehicle, the vehicle-body lower structure comprising:
   a front suspension member;
   a lower arm supported by the front suspension member; and
   a battery case that is disposed on a rear side of the front suspension member in a front-rear direction of the vehicle, the battery case housing a battery, wherein:
   the battery case includes:
      a front plate disposed on a front side of the battery case in the front-rear direction of the vehicle; and
      a frame extending in-a left right a lateral direction of the vehicle and disposed on a lower portion of the front plate; and
   a block is attached to a front portion of the frame in the front-rear direction of the vehicle, the block (i) being positioned side rearward of the lower arm in the front-rear direction of the vehicle and (ii) directly facing a rear end of the lower arm in the front-rear direction of vehicle so that when the lower arm moves rearward due to a front-end collision of the vehicle, the lower arm contacts the block without contacting the front plate of the battery case.

2. The vehicle-body lower structure according to claim 1, wherein:
   the front suspension member includes:
      a pair of suspension side beams each having a front end and a rear end fixed to a vehicle body of the vehicle; and
      a suspension crossmember that joins the pair of suspension side beams to each other; and
   a distance between the block and the lower arm is shorter than a distance between the front plate and the suspension crossmember.

3. The vehicle-body lower structure according to claim 2, wherein:
   a refrigerant pipe that sends a refrigerant to a cooler that cools the battery protrudes from the front plate to a front side in the front-rear direction of the vehicle; and
   a distance between the block and the lower arm is shorter than a distance between the refrigerant pipe and the suspension crossmember.

4. The vehicle-body lower structure according to claim 1, further comprising a reinforcement plate that joins the front suspension member and the block to each other.

5. The vehicle-body lower structure according to claim 4, wherein the reinforcement plate extends to a place below the battery case.

6. The vehicle-body lower structure according to claim 1, wherein the frame is fixed to a rocker of a vehicle body of the vehicle.

7. The vehicle-body lower structure according to claim 1, wherein the frame is fixed to a side frame of a vehicle body of the vehicle.

8. The vehicle-body lower structure according to claim 1, wherein the frame that extends in the lateral direction of the vehicle is disposed in front of the front plate in the front-rear direction of the vehicle.

9. A vehicle-body lower structure of a vehicle, the vehicle-body lower structure comprising:
   a front suspension member;
   a lower arm supported by the front suspension member; and
   a battery case that is disposed on a rear side of the front suspension member in a front-rear direction of the vehicle, the battery case housing a battery, wherein:
   the battery case includes:
      a front plate disposed on a front side of the battery case in the front-rear direction of the vehicle; and
      a beam extending in a lateral direction of the vehicle, the beam being disposed in front of the front plate in the front-rear direction of the vehicle, the beam having left and right ends that are attached to a vehicle body of the vehicle; and
   a block is attached to a front portion of the beam in the front-rear direction of the vehicle, the block being positioned immediately rearward of the lower arm in the front-rear direction of the vehicle so that when the lower arm moves rearward due to a front-end collision of the vehicle, (i) the lower arm contacts the block without contacting the front plate of the battery case and (ii) a collision load is transmitted from the lower arm to the vehicle body by being transmitted (a) from the lower arm directly to the block, and then (b) from the block directly to the beam, and then (c) from the beam directly to the vehicle body.

10. The vehicle-body lower structure according to claim 9, wherein the left and right ends of the beam are attached to rockers of the vehicle body.

11. The vehicle-body lower structure according to claim 9, wherein the left and right ends of the beam are attached to a side frame of the vehicle body.

12. The vehicle-body lower structure according to claim 9, wherein:
   the front suspension member includes:
      a pair of suspension side beams each having a front end and a rear end fixed to the vehicle body; and
      a suspension crossmember that joins the pair of suspension side beams to each other; and
   a distance between the block and the lower arm is shorter than a distance between the front plate and the suspension crossmember.

13. The vehicle-body lower structure according to claim 12, wherein:
   a refrigerant pipe that sends a refrigerant to a cooler that cools the battery protrudes from the front plate to a front side in the front-rear direction of the vehicle; and
   a distance between the block and the lower arm is shorter than a distance between the refrigerant pipe and the suspension crossmember.

14. The vehicle-body lower structure according to claim 9, further comprising a reinforcement plate that joins the front suspension member and the block to each other.

15. The vehicle-body lower structure according to claim 14, wherein the reinforcement plate extends to a place below the battery case.

* * * * *